(12) United States Patent
Kesiboyana et al.

(10) Patent No.: US 11,830,065 B2
(45) Date of Patent: *Nov. 28, 2023

(54) MULTI-LENDER LOAN APPLICATION MANAGEMENT SYSTEM

(71) Applicant: Capital One Services, LLC, McLean, VA (US)

(72) Inventors: Satish Kesiboyana, Plano, TX (US); Fredrick Allen Crable, Allen, TX (US); Jacques Morel, Colleyville, TX (US); Nicky Joshi, Flower Mound, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,350

(22) Filed: May 3, 2022

(65) Prior Publication Data
US 2022/0335522 A1  Oct. 20, 2022

Related U.S. Application Data

(63) Continuation of application No. 16/154,155, filed on Oct. 8, 2018, now Pat. No. 11,321,773.

(51) Int. Cl.
*G06Q 40/02* (2023.01)
*G06Q 40/03* (2023.01)

(52) U.S. Cl.
CPC .................... *G06Q 40/03* (2023.01)

(58) Field of Classification Search
CPC ........ G06Q 40/00; G06Q 40/02; G06Q 40/06; G06Q 40/03; G06F 40/174
See application file for complete search history.

(56) References Cited

U.S. PATENT DOCUMENTS 5,784,635 A * 7/1998 McCallum ............ G06F 40/151
710/63
8,065,225 B1 * 11/2011 Lewis, Jr. ............. G06Q 40/03
705/38

(Continued)

FOREIGN PATENT DOCUMENTS

CA 2900072 A1 * 2/2016 ........... G06Q 40/025

OTHER PUBLICATIONS

Fielding, Roy, "Architectural Styles and the Design of Network-based Software Architectures" 2000 University of California, Irvine Doctoral Dissertation. (Year: 2000).*

(Continued)

*Primary Examiner* — Kelly S. Campen
(74) *Attorney, Agent, or Firm* — Sterne, Kessler, Goldstein & Fox P.L.L.C.

(57) ABSTRACT

In one aspect, the present disclosure relates to a multi-lender loan management system comprising an external network gateway, an internal network gateway, a messaging service, a plurality of Application Programming Interface (API) modules coupled between the external network gateway and the internal network gateway, and a plurality of micro services coupled to the internal network gateway and configured to communicate with each other via the messaging service. API modules can include a client API module and a lender API module. Microservices can include a loan applications microservice and an offers microservice.

20 Claims, 5 Drawing Sheets

(56) References Cited

U.S. PATENT DOCUMENTS

| | | | |
|---|---|---|---|
| 8,504,438 B2* | 8/2013 | Bennett | G06Q 30/0601 |
| | | | 235/380 |
| 8,909,551 B2 | 12/2014 | Pawlusiak et al. | |
| 9,349,145 B2 | 5/2016 | Rozman et al. | |
| 9,589,301 B2* | 3/2017 | Bennett | G06Q 40/03 |
| 10,032,218 B1* | 7/2018 | Denbo | G06Q 40/02 |
| 10,210,570 B2* | 2/2019 | Bennett | G06Q 30/0601 |
| 10,424,013 B2* | 9/2019 | Bennett | G06Q 30/0239 |
| 10,580,071 B2* | 3/2020 | Forrester | G06Q 40/03 |
| 10,592,981 B2* | 3/2020 | Forrester | G06Q 40/03 |
| 10,679,271 B2 | 6/2020 | Singh et al. | |
| 11,514,520 B2* | 11/2022 | Forrester | G06Q 40/03 |
| 2001/0037288 A1* | 11/2001 | Bennett | G06Q 40/08 |
| | | | 705/38 |
| 2001/0039516 A1* | 11/2001 | Bennett | G06Q 30/0643 |
| | | | 705/26.8 |
| 2001/0047307 A1* | 11/2001 | Bennett | G06Q 30/02 |
| | | | 705/26.1 |
| 2003/0135451 A1* | 7/2003 | O'Brien | G06Q 40/03 |
| | | | 705/38 |
| 2005/0125349 A1 | 6/2005 | Bressard | |
| 2007/0027791 A1 | 2/2007 | Young et al. | |
| 2007/0244808 A1 | 10/2007 | Eze | |
| 2010/0023448 A1* | 1/2010 | Eze | G06Q 40/03 |
| | | | 705/38 |
| 2010/0312691 A1 | 12/2010 | Johnson, Jr. | |
| 2012/0296772 A1* | 11/2012 | Bennett | G06Q 40/03 |
| | | | 705/38 |
| 2014/0025563 A1* | 1/2014 | Bennett | G06Q 30/0617 |
| | | | 705/38 |
| 2014/0249937 A1* | 9/2014 | McNally | H04M 3/4938 |
| | | | 705/15 |
| 2015/0206234 A1 | 7/2015 | Forrester et al. | |
| 2015/0363862 A1 | 12/2015 | Ranft et al. | |
| 2016/0042451 A1* | 2/2016 | Raessler | G06Q 40/03 |
| | | | 705/38 |
| 2016/0071032 A1* | 3/2016 | Hunter | G06Q 10/0631 |
| | | | 705/7.12 |
| 2016/0171555 A1* | 6/2016 | Buerger | G06Q 30/02 |
| | | | 705/14.66 |
| 2016/0232546 A1 | 8/2016 | Ranft et al. | |
| 2016/0253753 A1* | 9/2016 | Bennett | G06Q 40/03 |
| | | | 705/26.43 |
| 2016/0321726 A1 | 11/2016 | Singh et al. | |
| 2017/0228821 A1* | 8/2017 | Reimer | G06Q 10/063 |
| 2018/0013579 A1* | 1/2018 | Fairweather | G06F 8/41 |
| 2018/0130127 A1* | 5/2018 | Forrester | G06Q 40/03 |
| 2018/0330437 A1* | 11/2018 | Raessler | G06Q 40/03 |
| 2020/0111157 A1 | 4/2020 | Kesiboyana et al. | |
| 2020/0193515 A1* | 6/2020 | Forrester | G06Q 40/03 |
| 2020/0372211 A1* | 11/2020 | Sundaram | G06F 16/9558 |
| 2022/0027932 A1* | 1/2022 | Sundaram | G06F 40/174 |
| 2022/0198557 A1* | 6/2022 | Forrester | G06Q 40/03 |

OTHER PUBLICATIONS

Fielding, Roy (Jun. 2014). "Hypertext Transfer Protocol (HTTP/1.1): Semantics and Content, Section 4". IETF. Internet Engineering Task Force (IETF). RFC 7231. Retrieved Feb. 14, 2018. (Year: 2014).*

Fielding, Roy (Jun. 2014). "Hypertext Transfer Protocol (HTTP/1.1): Semantics and Content, Section 4". IETF. Internet Engineering Task Force (IETF). RFC 7231. (Year: 2014).

LoanPro Software, LLC, "Loan Servicing API", https://loanprosoftware.simnang.com/loan-servicing-api.html, Simnang IP, LLC, Printed Jun. 27, 2018.

Fiserv, Inc., "Automotive Loan Origination System, Intelligent Integration and Auto-Decisioning Origination", printed Oct. 3, 2018.

* cited by examiner

MULTI-LENDER LOAN APPLICATION MANAGEMENT SYSTEM

CROSS-REFERENCE TO RELATED APPLICATION

This application is a continuation of U.S. application Ser. No. 16/154,155 filed on Oct. 8, 2018, issued as U.S. Pat. No. 11,321,773, and entitled "Multi-Lender Loan Management System," which is incorporated by reference herein in its entirety.

BACKGROUND

Consumers may finance automobiles, boats, and other high cost goods. A consumer can submit a loan application to one or more lenders who may, in turn, offer a loan with specific terms (e.g., loan amount, term, and interest rate). A loan application can include information about the consumer/purchaser, information about the goods being financed (e.g., vehicle make, model, and year), and one or more stipulations, among other information.

Dealers (e.g., automotive dealers) may facilitate the financing process by submitting loan applications on behalf of their customers to one or more lenders. Dealers may use a loan origination computer software to electronically enter loan application information, transmit the application to one or more lenders, and receive offers back from lenders. Existing systems may use legacy eXtensible Markup Language (XML)-based interfaces or even fax machines for transmitting loan applications to lenders. XML may have large overhead in terms of processing and size, degrading the performance of existing systems.

SUMMARY

According to one aspect of the present disclosure, a multi-lender loan management system includes: an external network gateway; an internal network gateway; a messaging service; a plurality of Application Programming Interface (API) modules coupled between the external network gateway and the internal network gateway; and a plurality of microservices coupled to the internal network gateway and configured to communicate with each other via the messaging service. The API modules can include a client API module configured to receive multi-lender loan applications from, and to send lender finance offers to, client devices via the external gateway, and a lender API module configured to send single-lender loan applications to, and receive lender offers from, lender origination systems via the external gateway. The plurality of microservices can include a loan applications microservice configured to coordinate the loan applications with the client API module and the lender API module via the messaging service, and an offers microservice configured to coordinate the lender finance offers between the lender API module and the client API module via the messaging service.

In some embodiments, the system can include an auth module coupled to the API modules and configured to verify the identity of the client devices. In some embodiments, the messaging service can include a plurality of streams including at least one of: a loan application stream; an offers stream; a lenders stream; and a contracts stream. In some embodiments, the plurality of microservices can include a customers microservice configured to store loan applications, loan offers, and preferences for one or more customers. In some embodiments, the plurality of microservices can include a contracts microservice configured to store information about contracts between lenders, customers, and dealers. In some embodiments, the plurality of microservices can include a pricing microservice configured to calculate a tier for one or more customers based on offers received for those customers and generate additional loan offers for the one or more customers based on the calculated tiers. In some embodiments, at least one of the API modules includes a RESTful API endpoints. In some embodiments, at least one of the API modules uses JavaScript Object Notation (JSON)-based object models. In some embodiments, at least one of the client devices is associated with an automotive dealership.

According to another aspect of the present disclosure, a method for improved efficiency in a financial computer network includes: receiving, from a client device, a multi-lender loan application including borrower information and a plurality of selected lenders; generating, for each of the plurality of selected lenders, a single-lender loan application including the borrower information; sending, for each of the plurality of selected lenders, the single-lender to a lender origination system associated with the selected lender; receiving a first lender offer as a callback from a lender origination system associated first one of the selected lenders; receiving a second lender offer as a callback from a lender origination system associated second one of the selected lenders; receiving, from the client device, a request to view offers received for the multi-lender loan application; and sending, to the client, information about the first lender offer and the second lender offer.

In some embodiments, the method includes verifying the identity of the client device. In some embodiments, receiving the multi-lender loan application includes receiving the multi-lender loan application using a RESTful APL In some embodiments, receiving the multi-lender loan application includes receiving a JavaScript Object Notation (JSON)-based object model of the multi-lender loan application. In some embodiments, the client device is associated with an automotive dealership. In some embodiments, receiving the multi-lender loan application comprises receiving the multi-lender loan application at a client API module. In some embodiments, sending the single-lender to a lender origination system comprises sending the single-lender by a lender API module. In some embodiments, the method can include coordinating, by a loan applications microservice, the loan applications with the client API module and the lender API module via a messaging service. In some embodiments, the method can include coordinating, by an offers microservice, the lender finance offers between the lender API module and the client API module via a messaging service.

According to another aspect of the present disclosure, a multi-lender loan management system includes: an external network gateway; an internal network gateway; a messaging service; a plurality of Application Programming Interface (API) modules coupled between the external network gateway and the internal network gateway; a plurality of microservices coupled to the internal network gateway and configured to communicate with each other via the messaging service; and an auth module coupled to the API modules and configured to verify the identity of the client devices. The messaging service can include a plurality of streams including at least one of: a loan application stream, an offers stream, a lenders stream, and a contracts stream. The plurality of API modules can include: a client API module configured to receive multi-lender loan applications from, and to send lender finance offers to, client devices via the external gateway; and a lender API module configured to send single-lender loan applications to, and receive lender offers from, lender origination systems via the external gateway. The plurality of microservices can include: a loan applications microservice configured to coordinate the loan applications with the client API module and the lender API module via the messaging service; an offers microservice configured to coordinate the lender finance offers between the lender API module and the client API module via the messaging service; a customers microservice configured to store loan applications, loan offers, and preferences for one or more customers; a contracts microservice configured to store information about contracts between lenders, customers, and dealers; and a pricing microservice configured to calculate a tier for one or more customers based on offers received for those customers and generate additional loan offers for the one or more customers based on the calculated tiers.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

According to embodiments of the present disclosure, a multi-lender loan management system can provide a streamlined experience for end users to submit a single loan application and receive offers from multiple lenders, and to execute the loan agreements electronically. The system can include a RESTful Application Programming Interface (API) and use JavaScript Object Notation (JSON)-based object models. The API can include endpoints allowing consumers and dealers to view the status of applications and details about received offers, as well as updating and re-submitting existing applications. Dealers (e.g., automotive dealerships) can seamlessly integrate their existing computer networks or websites with the system's APIs. The system according to some embodiments can manage the full lifecycle of a loan process, from gathering application information, required documentation, and executing the contract electronically (e-contract). The systems and methods disclosed herein improve upon existing computer-based loan origination systems by using RESTful, JSON-based APIs that are more efficient compared to data formats used by existing loan origination software.

Figure 1:
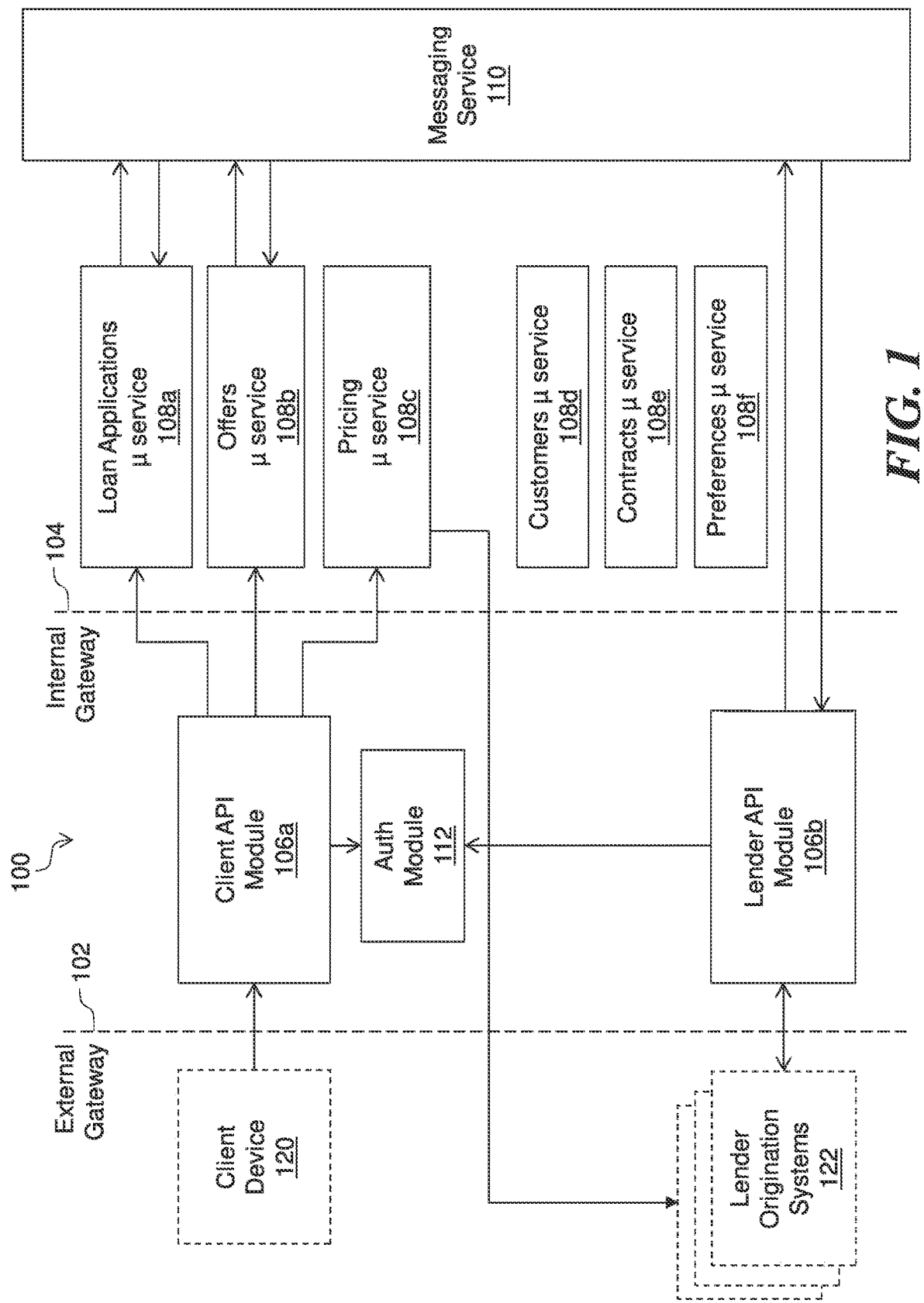
FIG. 1 is a diagram of a multi-lender loan management system, according to some embodiments of the present disclosure.

FIG. 1 shows a multi-lender loan management system 100, according to some embodiments of the present disclosure. The illustrative system 100 can include an external gateway 102, an internal gateway 104, a plurality of API modules 106a-106b (106 generally) coupled between the external 102 and internal gateways 104. The system 100 can further include a plurality of microservices 108a-108f (108 generally) coupled to the internal gateway 104 and a messaging service 110 via which components of the system can communicate. The API modules 106 and microservices 108 may be provided form any combination of hardware or software configured to perform the processing described herein. The various components of the system 100 may be coupled as shown in FIG. 1 or in any suitable manner. System components may be coupled via one or more wireless or wired computer networks.

Gateways 102 and 104 may correspond to network gateway devices. In some embodiments, gateways 102, 104 may be provided as network routers that manage and route network communications within the system 100. For example, internal gateway 104 may be configured to route communications between API modules 106 and microservices 108. In some embodiments, gateways 102, 104 may be provided as firewalls that restrict network traffic flowing into and out of the system 100, as well as regulating traffic within the system 100. For example, external gateway 102 can regulate network traffic coming into and out of the API modules 106. As another example, internal gateway 104 can regulate network traffic into and out of microservices 108. In some embodiments, external gateway 102 may restrict traffic to/from known client devices 120 and lender origination systems 122. The gateways can use static techniques (e.g., IP whitelists) or adaptive techniques to restrict network traffic. A skilled artisan will understand that number of gateways and the configuration of each gateway within the system 100 can be varied based on security, performance, or other requirements.

Client devices (or "clients") 120 can correspond to computing devices used by dealers and consumers, including for example desktop computers, laptop computers, smartphones, and tablets. In some embodiments, a client 120 may correspond to a computer (or network of computers) operated by a dealer. For example, a client 120 may correspond to one or more desktop or server computers located within an automotive dealership. In some embodiments, a client 120 may correspond to a website owned/operated by a dealer. Lender origination systems 122 can correspond to servers, networks, or other computer systems associated with a lender. In some embodiments, a lender origination system 122 may correspond to a bank computer network.

API modules 106 can include a client API module 106a and a lender API module 106b, according to some embodiments. Microservices 108 can include, for example, a loan applications microservice 108a, an offers microservice 108b, and a pricing microservice 108c. In some embodiments, the system 100 may further include a customers microservice 108d, a contracts microservice 108e, and/or a preferences microservice 108f.

Client API module 106a may be configured to process API requests received from client 120, perform initial validation of the requests, and then delegate further processing of the requests to one or more microservices 108. In some embodiments, clients 120 can send information to, and receive information from, API module 106a using an object-based data format, such as JSON.

Client API module 106*a* can include API endpoints for creating new loan applications, retrieving information about existing applications, and updating and resubmitting loan applications (e.g., to add a co-borrower or provide updated income information). Loan applications received from and returned to client 120 may be referred herein as "multi-lender" applications because they are a single entity used to submit loan applications to multiple lenders. Each multi-lender loan application may be assigned a unique identifier ("appId") within the system 100. When a multi-lender application is created, it can be assigned a new appId that is sent to the client 120 in a confirmatory response. AppIds can be used to identify specific multi-lender applications within an API endpoint or request. Client API module 106*a* can delegate requests to create/retrieve/update multi-lender applications to loan applications microservice 108*a*.

Client API module 106*a* can include an endpoint for retrieving offers associated with a multi-lender loan application. A client 120 can send a request to API module 106*a*, specifying an appId. API module 106*a* can, in turn, send a request to the offers microservice 108*b* requesting a list of offers that have been received for specified multi-lender application. The offers information can be returned to the client 120 as a list of data objects. Thus, using API module 106*a*, clients 120 can readily provide customer-centric views of multi-lender loan applications and offers.

Lender API module 106*b* may be configured to send loan applications to one or more lender origination systems 122. Loan applications sent to lenders may be referred herein to as "single-lender" applications because these applications are lender-specific and can be customized (in terms of content and formatting) for a particular lender 122. Each lender may have their own application data format and requirements and lender API module 106*b* can be configured to generate single-lender loan applications according to these lender-specific requirements. The system 100 can generate and transmit many single-lender applications based on one multi-lender application.

Lender API module 106*b* may be configured to process API requests received from lender origination systems 122, validate/transform the requests, and delegate processing to one or more microservices 108. In particular, lender API module 106*b* can include an endpoint (or "callback") via which lenders can submit loan offers. Offers information may be submitted in a specific data format used by the lender or in a format prescribed by the system 100 (e.g., a JSON-based format). Lender API module 106*b* can transform the offer information from a lender-specific format, as needed, before transmitting the offer to the offers microservice 108*b* via messaging service 110. Each offer can be assigned a unique identifier ("offerId") within the system 100. The system 100 may maintain a many-to-one relationship between offend and appIds.

In some embodiments, system 100 can include a plurality of lender API modules 106*b*, with each module instance configured for transmitting and receiving data according to the requirements of a particular lender origination system 122. In some embodiments, a plugin architecture may be employed to allow lender-specific code to be dynamically added to the system 100.

Figure 2:
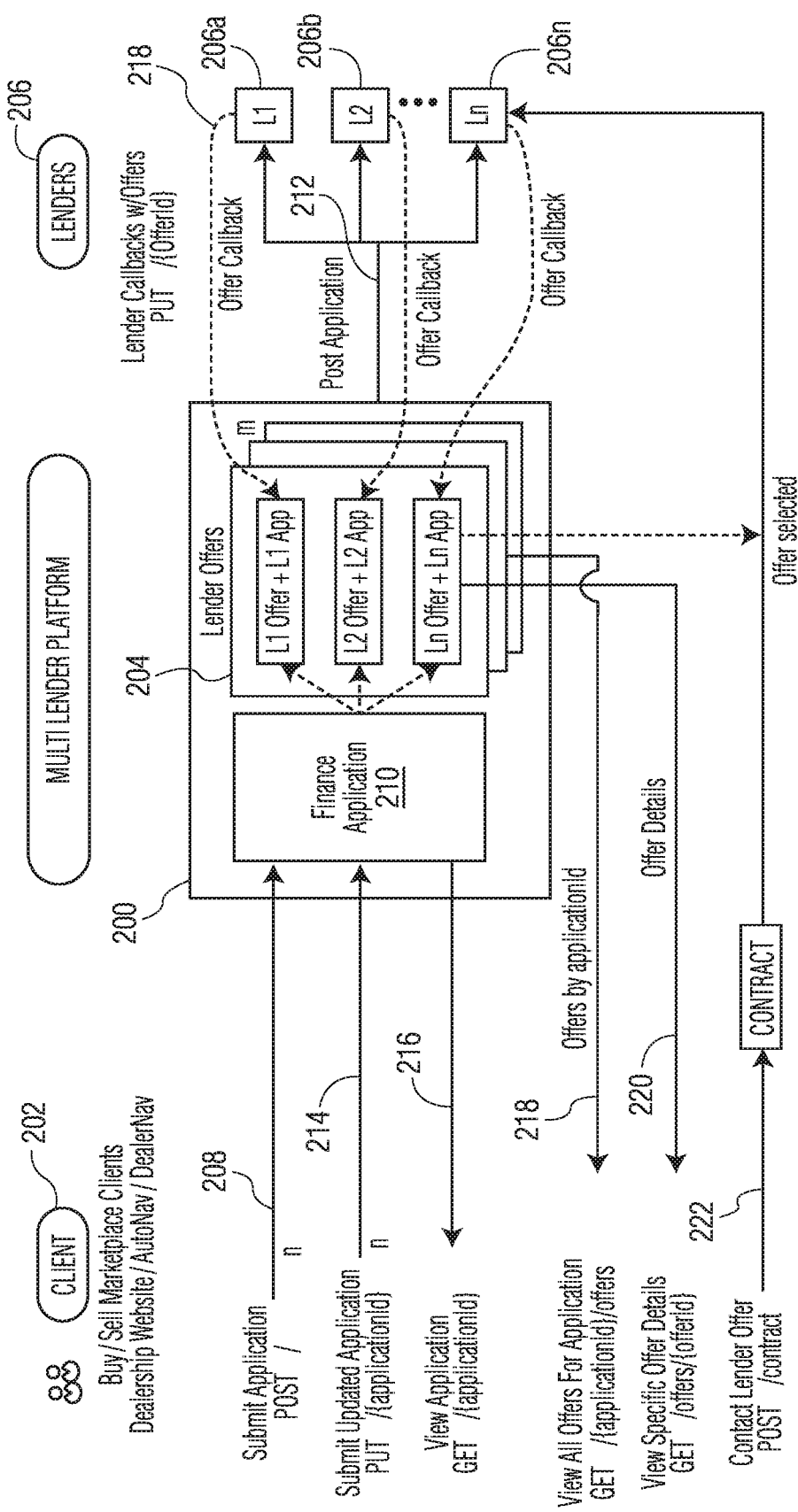
FIG. 2 is an interaction diagram for a multi-lender loan management system, according to some embodiments of the present disclosure.

In some embodiments, API modules 106 may include RESTful AP is such as illustrated in FIG. 2 and discussed in conjunction therewith. API requests and responses may include data encoded using JSON or another flexible, object-based data format.

The system 100 can also include an "auth" module 112 used by API modules 106*a*, 106*b* to authenticate and authorize requests received from client devices 120 and lender origination systems 122. In some embodiments, auth module 112 can verify the identity of clients 120 and/or lenders 122. A skilled artisan will understand that various techniques can be employed to authenticate/authorize API requests and verify clients 120.

Loan applications microservice 108*a* can receive requests from client API module 106*a* to create/submit new multi-lender loan applications, update existing multi-lender applications, and retrieve details of existing multi-lender applications. For a new application, microservice 108*a* can receive, from client API module 106*a*, an application data object representing the multi-lender application. Microservice 108*a* can assign the multi-lender application a new unique appid to the application and store the application in a database, such as APACHE CASSANDRA® or other distributed column store. Microservice 108*a* can transmit the multi-lender application to lender API module 106*b* via messaging service 110. The information sent to lender API module 106*b* can include the appid and list of lenders 122 to whom the application should be submitted. The newly assigned appid can be returned to the client API module 106*a* and, in turn, to the client 122. When an application update is requested, microservice 108*a* can internally create and store a new application and transmit the new application to selected lenders. The new application may be associated with the existing appid or with a newly assigned appid.

Offers microservice 108*b* can receive offer data objects from the lender API module 106*b* via messaging service 110. Microservice 108*b* can assign new offerIds- or in some cases the offends may have been previously assigned- and store information about the offers in a database. The database used to store offers can be the same as or different from the database used to store multi-lender applications. Offers microservice 108*b* can be configured to retrieve all offers associated with a given appid, as well as information about an individual offer (i.e., offend).

Pricing microservice 108*c* can generate additional loan offers for a customer based on previously received offers for the customer. Pricing microservice 108*c* can calculate or otherwise establish a "tier" for a given customer based on loan offers received for that customer. The microservice 108*c* can then swap out collateral (e.g., a vehicle) in the customer's loan application with new collateral (e.g., a different vehicle) and can generate a new loan offer based on the customer's tier and the value of the new collateral. The new loan offers may include, for example, an annual percentage rate (APR).

Customers microservice 108*d* can manage loan applications and offers for particular customers. Customers microservice 108*d* can include an API via which other system components can query applications/offers for a customer. In some embodiments, customers microservice 108*d* can manage and store customer preferences, such as which lending institutions a particular customer prefers to use, and which loan terms a customer prefers (e.g., only loans with a 36-month duration).

Contracts microservice 108*e* can store and manage information about contracts between lenders, customers, and dealers. Contracts microservice 108*e* can manage obtaining scanned or electronic signatures from the required parties.

Preferences microservice 108*f* can manage and store preference for lenders and/or dealers. For example, preferences microservice 108*f* may store, for a particular dealer, the list of vendors that the dealer prefers, or is willing, to do business with. As another example, preferences microservice 108*f* may store, for a particular lender, the list of dealers that the lender will do business with. In some embodiments, preferences microservice 108f may store a list of states or other geographic areas in which a particular lender does business. This information can be used by other components of the system to direct loan applications to the appropriate parties.

Messaging service 110 provides a mechanism by which the components of system 100 can communicate with each other. For example, messaging service 110 may include an API that a particular system component can use to send (or "write") data to message service 110, and that other system components can use to read the data back from messaging service 110. In some embodiments, messaging service 110 can include a distributed streaming platform having a plurality of data streams that the system components can write to and read from. In some embodiments, messaging service 110 can be configured to use the streams illustrated in FIG. 1B and described below in conjunction therewith. In some embodiments, messaging service 110 may be provided as APACHE KAFKA®.

In some embodiments, the system 100 may include an analytics API module (not shown) via which interested parties can obtain information regarding consumer and/or lender behavior. Such information can include, for example: the number of loan applications submitted in last week/month/etc.; the number of applications that were approved or declined by lender; customer tier information for a particular dealer; information about the quality of loans submitted by a dealer over time; and demographic information such as customer age or geography.

Figure 1A:
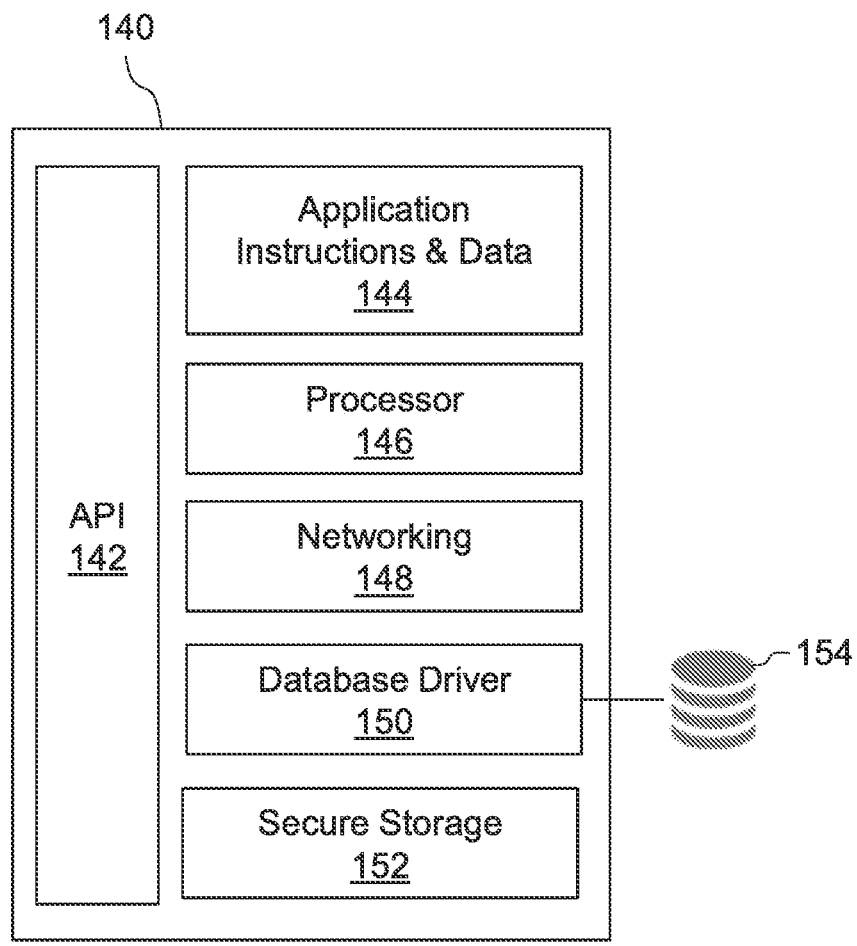
FIG. 1A is a block diagram of computing resources that may be present within the system of FIG. 1, according to some embodiments of the present disclosure.

FIG. 1A shows computing resources 140 that may be used within the system of FIG. 1, according to some embodiments of the present disclosure. For example, resources 140 may be present in a given API module 106 and/or a microservice 108. Illustrative computing resources 140 can include API instructions 142, application instructions and data 144, a processor 146, networking resources (e.g., networking hardware and/or software) 148, a database driver 150 configured to access a database 154, and secure storage 152. The API instructions 142 and application instructions 144 may be configured differently for each module/microservice in the system.

Figure 1B:
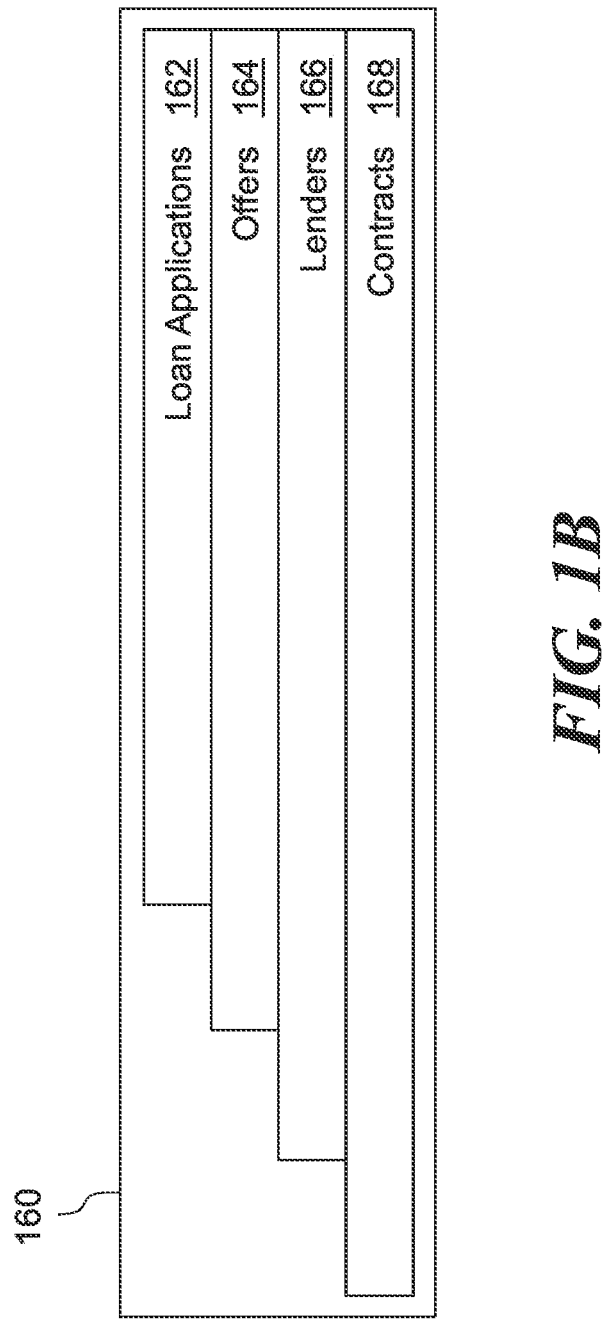
FIG. 1B is a diagram of illustrative messaging streams that can be used within the system of FIG. 1, according to some embodiments of the present disclosure.

Referring to FIG. 1B, messaging streams 160 may correspond to streams used by messaging service 110 of FIG. 1. In some embodiments, the messaging service may be provided as APACHE KAFKA® and the illustrative streams 160 may correspond to "topics" therein. A loan applications stream 162 can be used to send and receive multi-lender loan application objects. For example, applications microservice 108a can write application objects to stream 162 and lender API module 106b can read application objects from stream 162. An offers stream 164 can be used to send and receive offer objects. For example, lender API module 106b can write offer objects to stream 164 and offers microservice 108b can read offer objects from stream 164. A lenders stream 166 can be used to send and receive lender objects. For example, offers microservice 108e can write lender objects to stream 166, while lender API module 106b and contracts microservice 108e can read lender objects from stream 166. The contracts stream 168 can be used to send and receive contract objects. For example, contracts microservice 108e can write contract objects to stream 168 and customers microservice 108d can read contract objects from stream 168.

FIG. 2 is an interaction diagram for a multi-lender loan management system, according to some embodiments of the present disclosure. The illustrative system 200 can interact with a client device ("client") 202 and lender origination systems ("lenders") 206.

At step 208, client 202 can submit ("POST") a multi-lender finance application to the system 200. The submitted application may include information about the consumer/purchaser, information about the goods being financed (e.g., vehicle make, model, and year), and a list of vendors to whom the application should be submitted. The system 200 can assign a unique applicationId ("appId") and store the multi-lender application 210. The appId can be returned to the client 202 in a confirmatory response.

At step 212, system 200 can generate a plurality of single-lender loan applications and transmit each application to a respective lender 206a, 206b, . . . , 206n. At step 218, one or more of the lenders 206 can send an offer to a callback API endpoint of the system 200. For each offer received, the system 200 can store the received offers along with the corresponding single-lender application, as illustrated by box 204.

At step 214, client 202 can use the appId to submit ("PUT") updated information for the multi-lender application. At step 216, client 202 can use the appId to retrieve ("GET") information about the submitted multi-lender application. At step 218, client 202 can use the appId to retrieve ("GET") all offers received for the application, including the assigned offerIds. At step 220, client 202 can use the offerIds to retrieve ("GET") detailed information about a particular offer (e.g., by specifying the offerId). At step 222, the client can accept an offer and submit ("POST") a completed contract. As illustrated in FIG. 2, the contract may be transmitted directly to the lender 206 that made the offer. In some embodiments, a third party e-contract service may be used at step 222.

Figure 3:
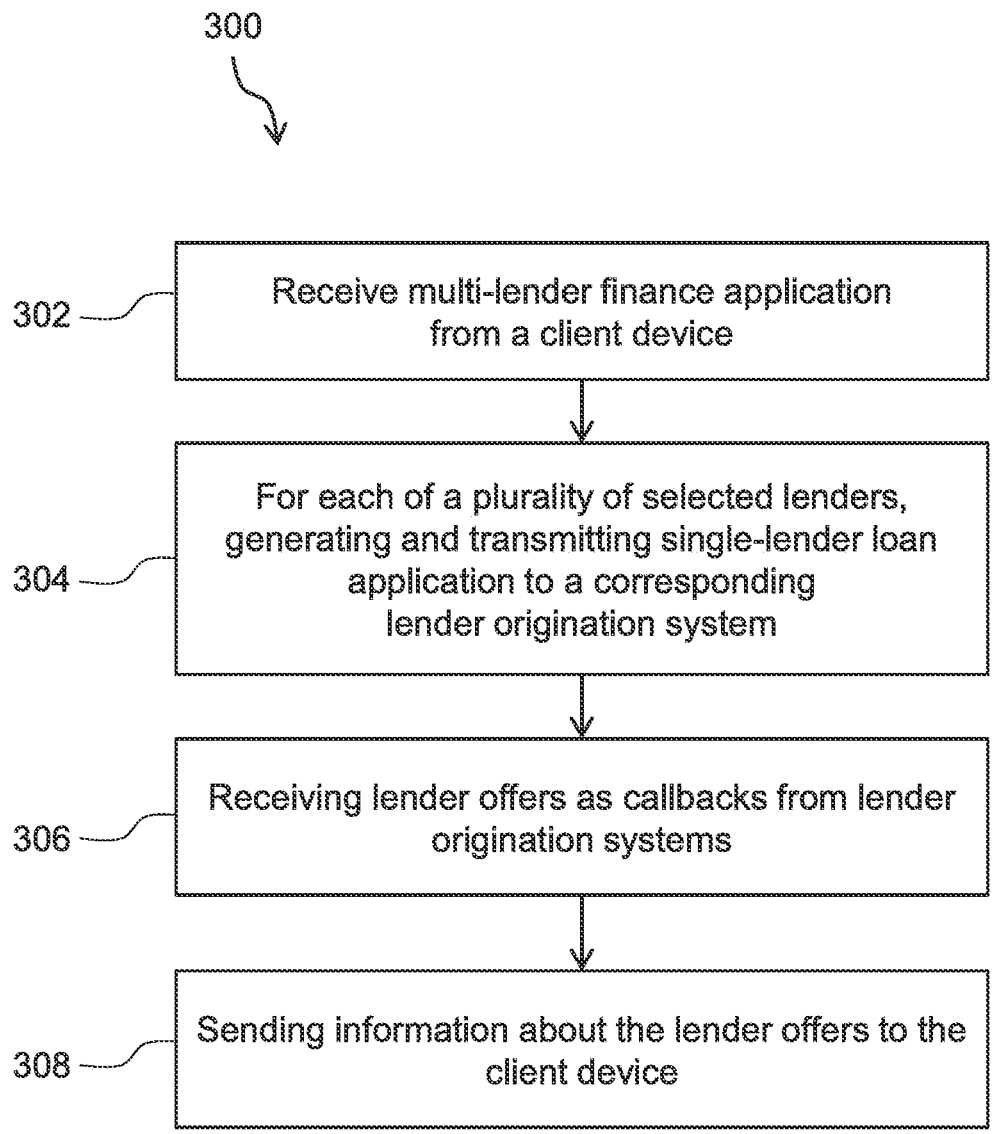
FIG. 3 is a flow diagram showing processing that may occur within the system of FIG. 1, according to some embodiments of the present disclosure.

Referring to FIG. 3, a method 300 can be implemented within a multi-lender loan management system, such as system 100 of FIG. 1 and/or system 200 of FIG. 2.

At block 302, a multi-lender finance application can be received from a client device. The client device may be associated with a consumer or a dealer (e.g., an automotive dealership). The multi-lender finance application may include a list of lenders to whom the application should be submitted. In some embodiments, the processing of block 302 may be implemented within a client API module (e.g., module 106a in FIG. 1).

At block 304, for each of the indicated lenders, a single-lender loan application may be generated and transmitted to a corresponding lender origination system. In some embodiments, portions of processing of block 306 may be implemented within a loan applications microservice (e.g., microservice 108a in FIG. 1) and a lender API module (e.g., module 106b in FIG. 1). For example, the loan applications can generate the single-lender loan applications and send the applications to lender API module via a messaging service (e.g., service 110 in FIG. 1). The lender API module can then transmit each single-lender loan application to a respective lender origination system.

At block 306, one or more offers may be received from the lender origination systems. In some embodiments, the lender API module may implement the processing of block 306.

At block 308, information about the received offers may be sent to the client device. In some embodiments, portions of processing of block 308 may be implemented within an offers microservice (e.g., microservice 108b in FIG. 1) and the client API module. For example, the offers microservice can receive the lender offers from the lender API module via the messaging service. The offers microservice can then send the received offers to the client API module which, in turn, sends offer information to the client device.

In some embodiments, each step of the method 300 may involve one or more RESTful API requests such as discussed above in conjunction with FIGS. 1 and 2.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method comprising:
receiving, via an external network gateway from a client device and at a client application programming interface (API) module hosted on a computing system, a multi-lender loan application comprising borrower information and a plurality of selected lenders;
assigning, by a loan applications microservice, a unique application identifier to the multi-lender loan application;
generating, by a processor of the computing system and responsive to receiving the multi-lender loan application, a plurality of single-lender loan applications, wherein each single-lender loan application comprises the borrower information and a plurality of data elements formatted specifically for each lender of the plurality of selected lenders in accordance with a lender-specific loan application data format and loan application requirements for each lender,
wherein the plurality of single-lender loan applications comprises a first lender-specific single-lender loan application associated with a first lender of the plurality of selected lenders, the first lender-specific single-lender loan application having a first lender-specific loan application data format and a first set of loan application requirements, and
wherein the plurality of single-lender loan applications comprises a second lender-specific single-lender loan application for a second lender of the plurality of selected lenders, the second lender-specific loan application having a second lender-specific loan application data format and a second set of loan application requirements;
sending, by a lender API module via the external network gateway, the first lender-specific single-lender loan application to a first lender origination system associated with the first lender and the second lender-specific single-lender loan application to a second lender origination system associated with the second lender;
receiving, by an offers microservice via the external network gateway, a first lender offer from the first lender origination system and a second lender offer from the second lender origination system;
associating, by the offers microservice, the first lender offer and the second lender offer with the unique application identifier, wherein the unique application identifier is associated with a plurality of lender offers including the first lender offer and the second lender offer; and receiving, from the client device, a request to retrieve the first lender offer and the second lender offer, wherein the request includes the unique application identifier.

2. The method of claim 1, wherein associating the first lender offer and the second lender offer with the unique application identifier further comprises:

mapping a first unique offer identifier of the first lender offer with the unique application identifier; and mapping a second unique offer identifier of the second lender offer with the unique application identifier.

3. The method of claim 2, further comprising:

receiving, by the client device, the first unique offer identifier and the second unique offer identifier using the unique application identifier.

4. The method of claim 2, further comprising:

retrieving, by the client device, first offer information using the first unique offer identifier; and retrieving, by the client device, second offer information using the second unique offer identifier.

5. The method of claim 1, wherein the client device is associated with an automotive dealership.

6. The method of claim of claim 1, further comprising:

receiving, from the client device, a completed contract corresponding to at least one of the first lender offer or the second lender offer.

7. The method of claim 1, wherein receiving the multi-lender loan application comprises receiving a JavaScript Object Notation (JSON)-based object model of the multi-lender loan application.

8. The method of claim 7, wherein the first lender offer comprises first offer objects and the second lender offer comprises second offer objects and wherein the first offer objects and the second offer objects are based on the JSON-based object model.

9. The method of claim 8, wherein receiving the first lender offer from the first lender origination system associated with the first lender and the second lender offer from the second lender origination system comprises:

reading, by the offers microservice, the first offer objects from a message stream between the offers microservice and the first lender origination system; and reading, by the offers microservice, the second offer objects from the message stream between the offers microservice and the second lender origination system.

10. The method of claim 9, wherein the message stream comprises a plurality of data streams including an application objects stream, an offer objects stream, a lender objects stream, and a contract objects stream.

11. A multi-lender loan management system comprising:

an external network gateway;

an internal network gateway;

messaging service;

a plurality of Application Programming Interface (API) modules hosted on a computing system coupled between the external network gateway and the internal network gateway, and a plurality of microservices coupled to the internal network gateway and configured to communicate with each other via the messaging service, wherein the plurality of API modules and the plurality of microservices are configured to perform operations, comprising:

receiving, via the external network gateway from a client device and at a client application programming interface (API) module hosted on the computing system, a multi-lender loan application comprising borrower information and a plurality of selected lenders;

assigning, by a loan applications microservice, a unique application identifier to the multi-lender loan application;

generating, by a processor of the computing system and responsive to receiving the multi-lender loan application, a plurality of single-lender loan applications, wherein each single-lender loan application comprises the borrower information and a plurality of data elements formatted specifically for each lender of the plurality of selected lenders in accordance with a lender-specific loan application data format and loan application requirements for each lender, wherein the plurality of single-lender loan applications comprises a first lender-specific single-lender loan application associated with a first lender of the plurality of selected lenders, the first lender-specific single-lender loan application having a first lender-specific loan application data format and a first set of loan application requirements, and wherein the plurality of single-lender loan applications comprises a second lender-specific single-lender loan application for a second lender of the plurality of selected lenders, the second lender-specific loan application having a second lender-specific loan application data format and a second set of loan application requirements;

sending, by a lender API module via the external network gateway, the first lender-specific single-lender loan application to a first lender origination system associated with the first lender and the second lender-specific single-lender loan application to a second lender origination system associated with the second lender;

receiving, by an offers microservice via the external network gateway, a first lender offer from the first lender origination system and a second lender offer from the second lender origination system;

associating, by the offers microservice, the first lender offer and the second lender offer with the unique application identifier, wherein the unique application identifier is associated with a plurality of lender offers including the first lender offer and the second lender offer; and receiving, from the client device, a request to retrieve the first lender offer and the second lender offer, wherein the request includes the unique application identifier.

12. The multi-lender loan management system of claim 11, wherein in associating the first lender offer and the second lender offer with the unique application identifier, the operations further comprise:

mapping a first unique offer identifier of the first lender offer with the unique application identifier; and mapping a second unique offer identifier of the second lender offer with the unique application identifier.

13. The multi-lender loan management system of claim 12, wherein the operations further comprise:

receiving, by the client device, the first unique offer identifier and the second unique offer identifier using the unique application identifier.

14. The multi-lender loan management system of claim 12, wherein the operations further comprise:

retrieving, by the client device, first offer information using the first unique offer identifier; and retrieving, by the client device, second offer information using the second unique offer identifier.

15. The multi-lender loan management system of claim 11, wherein the client device is associated with an automotive dealership.

16. The multi-lender loan management system of claim 11, wherein the operations further comprise:

receiving, from the client device, a completed contract corresponding to at least one of the first lender offer or the second lender offer.

17. The multi-lender loan management system of claim 11, wherein receiving the multi-lender loan application comprises receiving a JavaScript Object Notation (JSON)-based object model of the multi-lender loan application.

18. The multi-lender loan management system of claim 17, wherein the first lender offer comprises first offer objects and the second lender offer comprises second offer objects and wherein the first offer objects and the second offer objects are based on the JSON-based object model.

19. The multi-lender loan management system of claim 18, wherein the messaging service communicates a message stream between the offers microservice and the first lender origination system and between the offers microservice and the second lender origination system and wherein receiving the first lender offer from the first lender origination system associated with the first lender and the second lender offer from the second lender origination system comprises:

reading, by the offers microservice, the first offer objects from the message stream; and reading, by the offers microservice, the second offer objects from the message stream.

20. The multi-lender loan management system of claim 19, wherein the message stream comprises a plurality of data streams including application objects stream, an offer objects stream, a lender objects stream, and a contract objects stream.

\* \* \* \* \*